United States Patent [19]

Ueda et al.

[11] Patent Number: 4,685,318

[45] Date of Patent: Aug. 11, 1987

[54] ROTARY CUTTER FOR CUTTING A CONTINUOUS CORRUGATED STRIP

[75] Inventors: Masahiro Ueda, Chiryu; Kohei Hakamata, Toyota; Seigo Tsuchiya, Anjo, all of Japan

[73] Assignee: Nippondenso Co., Ltd., Kariya, Japan

[21] Appl. No.: 815,053

[22] Filed: Dec. 31, 1985

[30] Foreign Application Priority Data

Jan. 8, 1985 [JP] Japan ................................ 60-450

[51] Int. Cl.$^4$ ............................................ B21D 13/04
[52] U.S. Cl. ........................................ 72/185; 83/304; 83/337
[58] Field of Search ....................... 72/185, 326, 331; 83/296, 304, 337

[56] References Cited

U.S. PATENT DOCUMENTS

| | | | |
|---|---|---|---|
| 1,304,034 | 5/1919 | Edwards | 83/304 |
| 2,405,204 | 8/1946 | Goodrich | 83/337 |
| 2,761,513 | 9/1956 | Stram | 83/304 |
| 3,263,465 | 8/1966 | Way et al. | 72/331 |
| 4,480,456 | 11/1984 | Iwase et al. | 72/185 |

FOREIGN PATENT DOCUMENTS 678029 8/1952 United Kingdom ................. 83/337

Primary Examiner—Lowell A. Larson
Attorney, Agent, or Firm—Cushman, Darby & Cushman

[57] ABSTRACT

A high speed rotary cutter includes a rotary drum rotated at varying speeds in synchronization with an associated toothed counterwheel. The rotary drum includes at least one reciprocative cutter blade which is movable radially of the drum into and out of engagement with at least one fixed cutter blade provided on the toothed counterwheel. The movement of the reciprocative cutter blade between a projected and a retracted position thereof is controlled by a rotary cam which is located inside of the rotary drum coaxially therewith and which is driven by a servomotor. The rotary cutter also includes a control unit which controls the servomotor in such a manner that, during a cutting mode, the rotary cam is rotated with its cam nose engaged with the reciprocative cutter blade to urge it into engagement with the fixed cutter blade to shear a continuous corrugated strip. During a non-cutting mode, the cam nose is angularly offset from the reciprocative cutter blade to retract the latter within the drum, thereby allowing the strip to pass through the rotary cutter without undergoing shearing.

7 Claims, 10 Drawing Figures

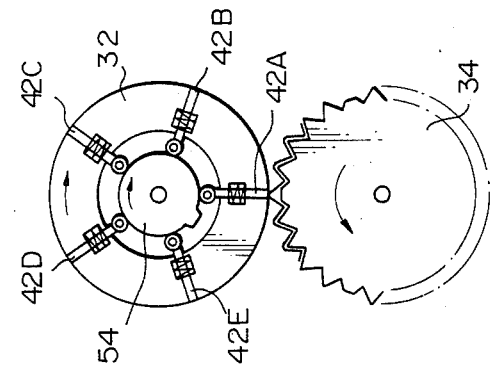
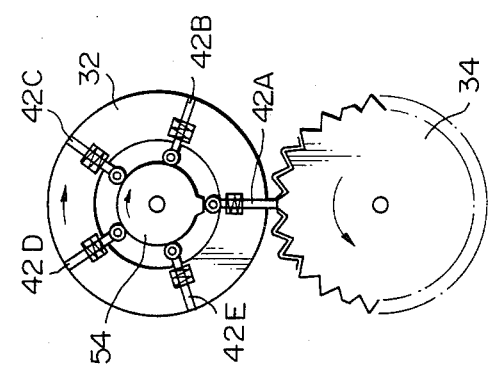
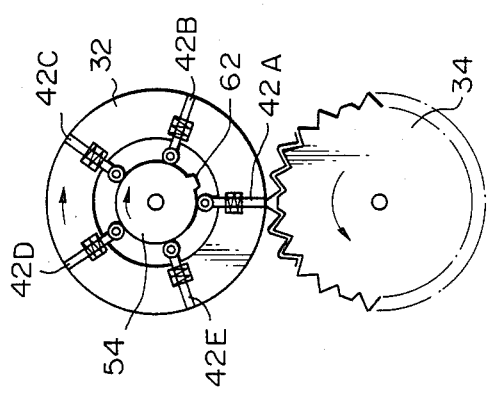

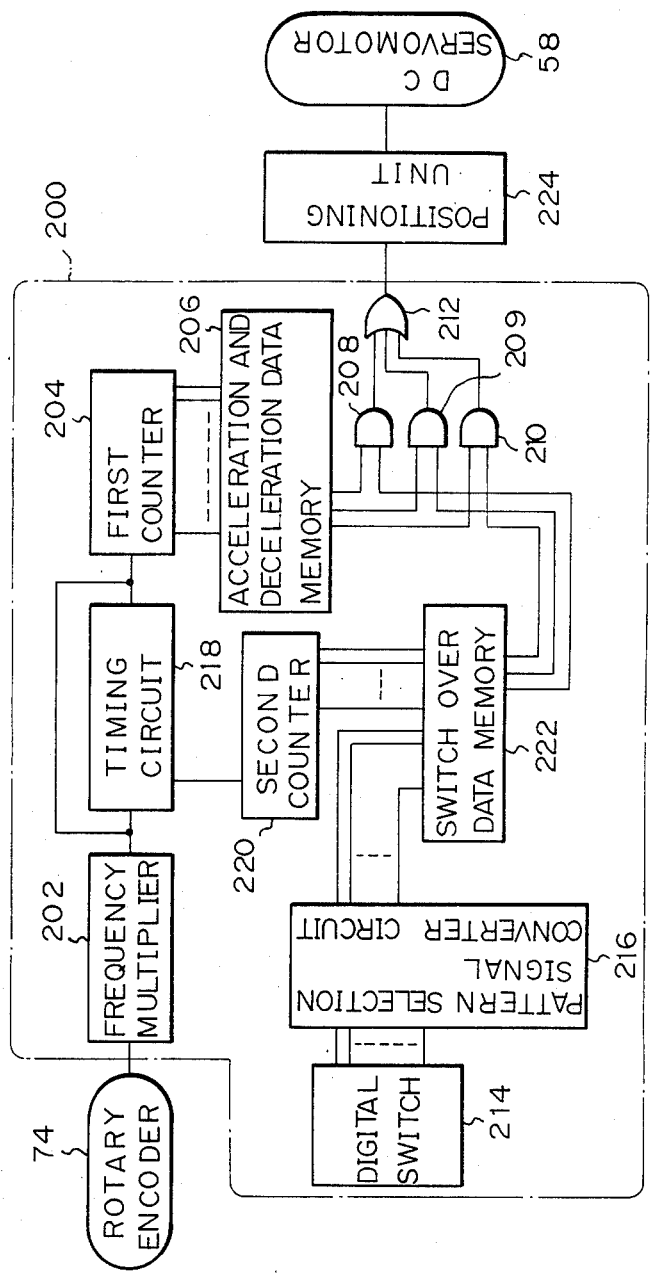

ROTARY CUTTER FOR CUTTING A CONTINUOUS CORRUGATED STRIP

BACKGROUND OF THE INVENTION

1. Field of the Invention

The present invention relates to a rotary cutter for cutting a continuous corrugated strip into strip sections having variable lengths. More particularly, this invention is applicable to a rotary cutter for shearing a metallic corrugated strip into sections which are used as corrugated fins in the manufacture of automobile radiators.

2. Description of the Related Art

Certain types of automotive radiator cores include corrugated fins welded or soldered to water tubes. Corrugated fins are obtained by passing a continuous metallic strip between a pair of toothed forming rollers or wheels to form a continuous corrugated strip, which is then sheared by a cutting machine into sections having a desired length. For the manufacture of radiators on a mass production basis, it is desirable for a cutting machine to operate at as high a speed as possible to shear a corrugated strip discharged continuously and at a high speed from the forming rollers. Another requirement for a cutting machine is the capability of shearing the corrugated strip into a desired length, which may vary depending upon the size of the radiator cores to be manufactured. A further requirement is to cut the corrugated strip precisely at a desired shearing point in order to obtain a series of strip sections having a uniform length.

U.S. Pat. No. 4,480,456 issued to Iwase et al. illustrates an example of a conventional cutting machine of the flying shear type which is adapted to cut a continuous corrugated strip into strip sections usable in radiator cores. The cutting machine includes a reciprocating carriage which is driven for reciprocating movement along the continuous corrugated strip emerging from the forming rollers. The carriage has mounted thereon a movable cutter blade of the guillotine type that cooperates with an associated fixed cutter blade on the carriage to shear the strip at the nadir of a corrugation. To perform shearing, the carriage is accelerated to move in synchronization with the moving strip and the movable cutter blade is then activated. Thereafter, the carriage is returned to the original position in order to be ready for the next shearing. The processing speed of this machine is limited due to the fact that the carriage, having a considerable inertia mass, must be reciprocated every time shearing is effected. Another problem arises when the processing speed of the machine is changed in order for the cutting machine to be switched over from an operational mode, wherein a series of strip sections having a given length are produced, to another mode wherein another series of strip sections having different length are to be manufactured. It has been found that, in conventional reciprocating cutting machines, it is difficult to make the carriage speed follow the change in the processing speed, thereby failing to effect shearing exactly at the nadir of a corrugation and to produce strip sections having a uniform length immediately after the change in the operational mode.

SUMMARY OF THE INVENTION

The present invention contemplates to overcome the foregoing disadvantages and has for its object to provide a corrugated strip cutter which is operable at an extremely high speed as compared with conventional cutting machines and which is capable of performing shearing precisely at a desired shearing point even during the change-over of operational modes.

According to the invention, the cutter is of the rotary type and is designed to shear the continuous corrugated strip at the apex of a corrugation. The rotary cutter comprises a rotary drum and a toothed counterwheel which are mounted adjacent to each other. The rotary drum is provided with at least one movable cutter blade which is mounted thereon radially slidably to protract from and retract within the rotary drum. The toothed counterwheel is rotated in synchronization with the rotary drum and is provided with a fixed cutter blade cooperating with the movable cutter blade. The continuous corrugated strip to be sheared is fed between the rotary drum and the toothed counterwheel and is advanced by the toothed counterwheel by positive engagement. The movable cutter blade on the rotary drum is normally biased radially inward by a spring means. A rotary cam is positioned inside of the rotary drum coaxially therewith and has a cam nose engageable with the inner end of the movable cutter blade to project the movable cutter blade radially outward. The rotary cam is rotated by a drive which is controlled by a control unit.

During the non-cutting mode of operation of the rotary cutter, the rotary cam is rotated in synchronization with the rotary drum, with its cam nose being offset from the movable cutter blade so that the cutting edge provided at the outer end of the movable cutter blade is retracted within the rotary drum. This permits the continuous corrugated strip to be advanced between the rotary drum and the toothed counterwheel without being subjected to shearing.

During the cutting mode of operation, the rotary cam is rotated with the cam nose thereof brought into engagement with the inner end of the movable cutter blade thereby to project the cutting edge of the movable cutter blade radially outward out of the outer circumference of the rotary drum. Thus, the cutting edge engages with the cooperating fixed cutter blade to shear the corrugated strip. After cutting, the angular position of the rotary cam with respect to the rotary drum is then altered in such a manner that the cam nose is again offset from the movable cutter blade until the next shearing.

These and other features of the invention will be described below in more detail with reference to the preferred embodiment illustrated in the accompanying drawings.

BRIEF DESCRIPTION OF THE DRAWINGS

FIGS. 6A through 6C are schematic front elevational views of the rotary cutter, illustrating the rotary cam in three different phases;

FIG. 7 is a block diagram of the control unit; and

DESCRIPTION OF THE PREFERRED EMBODIMENT

Figure 1:
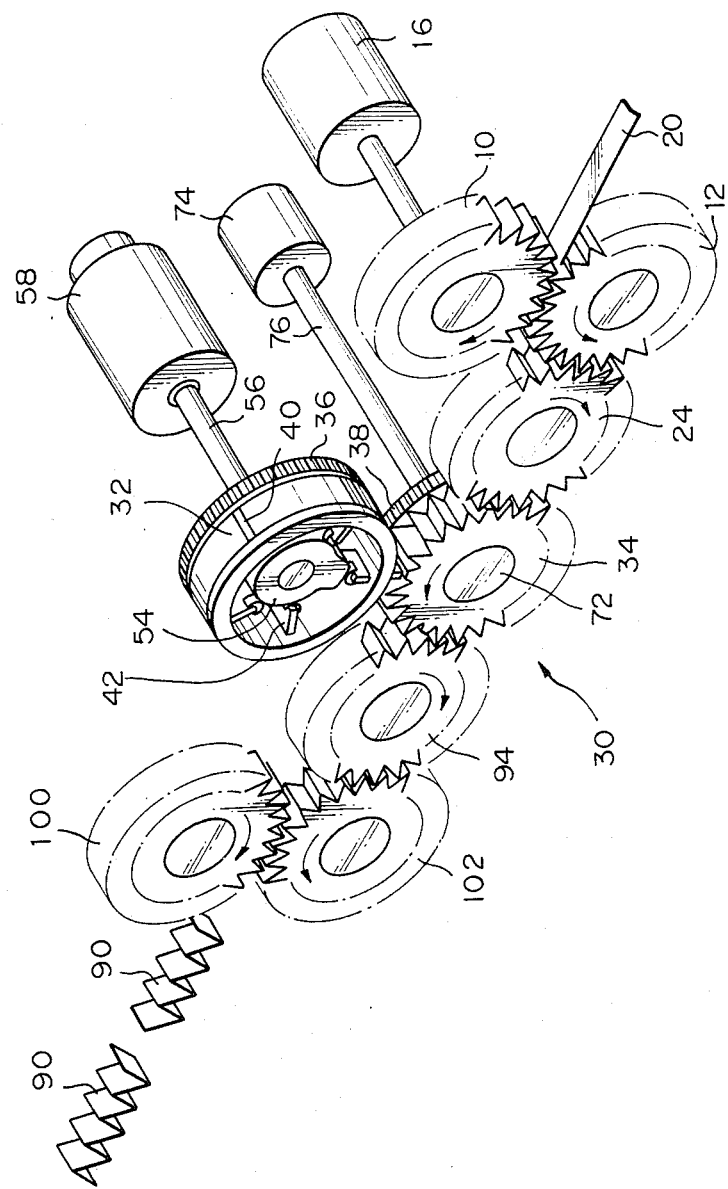
FIG. 1 is a schematic perspective view illustrating the essential parts of a corrugated fin manufacturing apparatus incorporating the rotary cutter according to the present invention as combined with a corrugation forming station.
Figure 2:
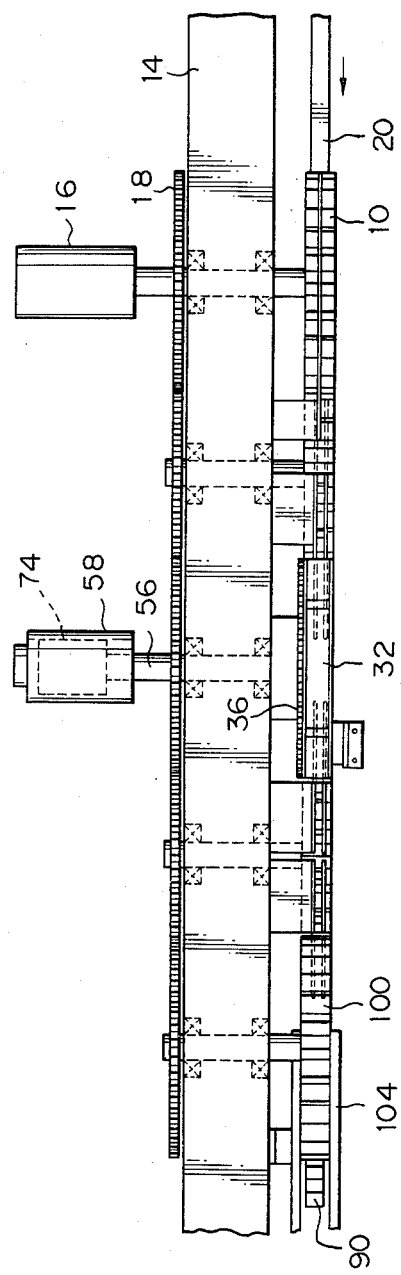
FIG. 2 is a plan view of the apparatus shown in FIG. 1.
Figure 3:
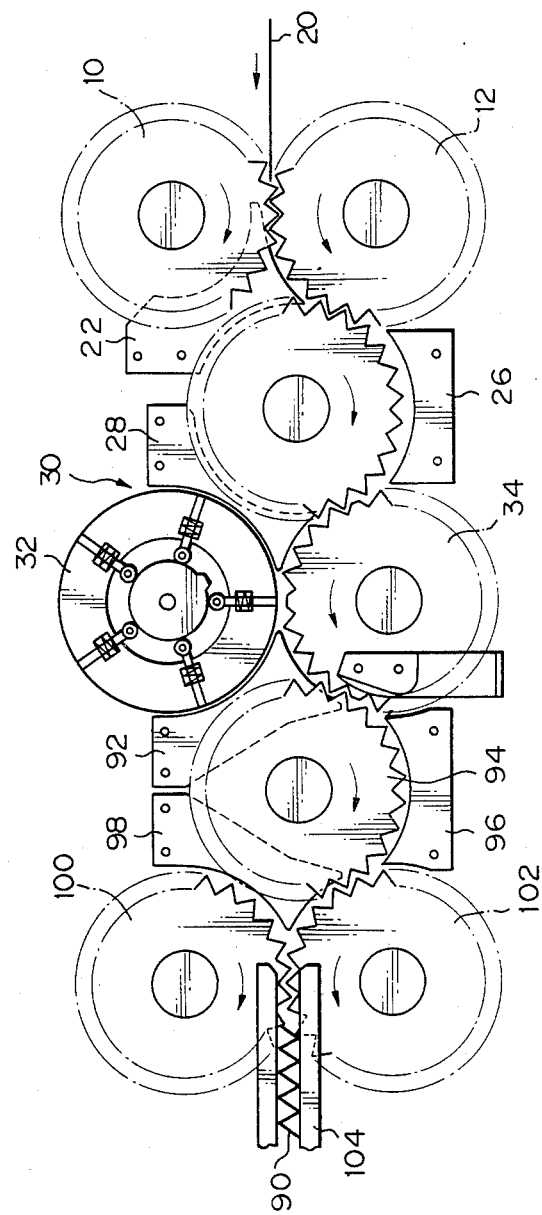
FIG. 3 is a front elevational view of the apparatus shown in FIG. 1.

FIGS. 1 through 3 schematically show a corrugated fin manufacturing apparatus including, in combination, the rotary cutter according to the present invention and a forming station. The forming station comprises a pair of toothed forming wheels 10 and 12 which are rotatably supported by a frame 14 in a cantilever manner by suitable bearings. One of the forming wheels, say, the wheel 10, is adapted to be rotated by, for example, an AC motor 16. The toothed forming wheels 10 and 12 are rotated in a synchronized relationship with each other by a meshing gear train provided at the other side of the frame, one gear of the gear train being shown at 18 in FIG. 2. The forming wheels 10 and 12 cooperate together to corrugate a flat strip 20 being fed from a strip supply source, not shown. The thus formed continuous corrugated strip is guided by a guide plate 22 (FIG. 3) to reach a toothed feed wheel 24 which advances the strip through guide plates 26 and 28 (FIG. 3) toward the rotary cutter 30.

The rotary cutter 30 comprises a rotary drum 32 and a toothed counterwheel 34 which are rotatably mounted to the frame 14 in a cantilever fashion. The rotary drum 32 and the counterwheel 34 are spaced apart in such a manner as not to interfere with each other and to form therebetween a nip which is slightly larger than the thickness of the corrugated strip. The rotary drum 32 is rotated in synchronization with the toothed counterwheel 34 by means of gears 36 and 38 meshing with each other and having the same number of teeth. The counterwheel 34 may be driven by the AC motor 16 through a suitable gear train.

In the illustrated embodiment, the rotary drum 32 is provided with five radial slots extending in the axial direction and spaced apart from each other at an equal angular distance, one of the slots being shown at 40 in FIG. 1. Correspondingly, the toothed counterwheel 34 is provided with five fixed cutter blades, described later, which are similarly spaced apart from each other at an equal angle. In the illustrated embodiment, the counterwheel 34 has 25 teeth so that the fixed cutter blades are provided one for every five teeth of the counterwheel.

Figure 4:
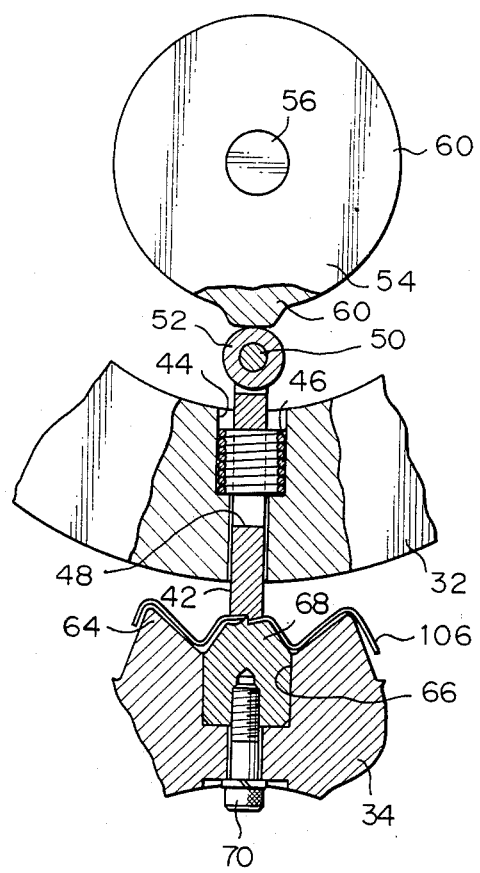
FIG. 4 is an enlarged front elevational view, partly cut away, of the rotary cutter illustrated in FIG. 1.

As shown in FIG. 4, each slot 40 in the rotary drum 32 slidably receives therein a movable or reciprocative cutter blade 42. The inner part of each radial slot is merged into a cylindrical recess 44 in which a coil spring 46 is received. The coil spring 46 extends across a rectangular aperture 48 in the reciprocative cutter blade 42 and has its inner end bearing against the side wall of the aperture 48 and its outer end seated on the bottom of the cylindrical recess 44. Thus, the coil spring 46 serves to urge the reciprocative cutter blade 42 radially inward. The inner end of the movable cutter blade 42 is bifurcated and rotatably supports a cam follower roller 52 mounted around a pivot 50.

As shown in FIGS. 1 through 4, a rotary cam 54 is positioned inside of the rotary drum 32 coaxially therewith and is secured to an end of a shaft 56 rotatably supported by the frame 14. The other end of the shaft 56 is coupled to a DC servomotor 58.

As shown in FIG. 4, the rotary cam 54 includes a cam heel 60 having a profile in the form of an arc of a circle and a cam nose 62 projecting therefrom. It will be noted that as the rotary cam 54 angularly displaces with respect to the rotary drum 32, the roller 52 will roll on the rotary cam 54 causing the outer end of the reciprocative cutter blade 42 to project out of and retract within the associated slot 40.

Referring further to FIG. 4, the outer periphery of the counterwheel 34 is cut out for every five teeth 64 to form an axial groove 66 in which a fixed cutter blade 68 is fitted and fixed by screws 70. The fixed cutter blade 68 may, therefore, be readily dismounted for repair and replacement by removing the screws 70. As will be apparent from FIG. 1, the counterwheel 34 has a shaft 72 connected to a shaft 76 of a rotary encoder 74 which is adapted to deliver a predetermined number of pulse signals for each revolution of the counterwheel 34.

Figure 5:
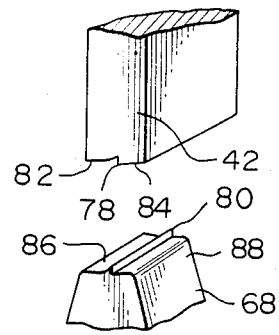
FIG. 5 is an enlarged perspective partial view of the movable and fixed cutter blades.

As best shown in FIG. 5, the movable and fixed cutter blades 42 and 68 are provided with cooperating cutting edges 78 and 80, respectively. The tips of the cutter blades 42 and 68 preferably have generally flat shoulders 82, 84, 86, and 88 which, when the movable cutter blade 42 is brought into engagement with the associated fixed cutter blade 68 to cut the continuous corrugated strip into sections, serve to press-form or stamp the ends of the sections at both sides of the shear line to preclude the ends from being warped due to the spring-back force of the strip material.

The corrugated strip section 90 which has been cut into a predetermined length by the rotary cutter 30 is advanced by a toothed feed wheel 94 on being guided by a guide plate 92 and moves past guide plates 96 and 98 into a pair of toothed feed wheels 100 and 102, which finally discharge the strip section onto a chute 104.

The principle of operation of the rotary cutter 30 according to the invention will be described with reference to FIGS. 6A through 6C, wherein the rotary drum 32 is illustrated as being in the identical angular position. During the non-cutting mode of operation of the rotary cutter 30, the rotary cam 54 is rotated in a synchronized relationship with and at the same speed as the rotary drum 32, with the cam nose 62 of the rotary cam 54 being offset from either of the reciprocative cutter blades 42A, 42B, 42C, 42D, and 42E, as shown in FIG. 6A. In the cutting mode, the rotary cam 54 is first accelerated, during one complete revolution of the rotary drum 32 as measured from the angular position shown in FIG. 6A, to advance the angular phase of the rotary cam 54 with respect to the rotary drum 34 by, for example, 45°, so that the cam nose 62 engages the movable cutter blade 42A causing it to project out of the rotary drum 32. Thereafter, the rotary cam 54 is decelerated to rotate in synchronization with the rotary drum 32. The projecting movable cutter blade 42A is then moved past the nip formed between the rotary drum 32 and the counterwheel 34 as shown in FIG. 6B, whereby the reciprocative cutter blade 42A comes into engagement with the associated fixed blade 68 thereby shearing the continuous corrugated strip at the apex of a corrugation (FIG. 4). After shearing, the rotary cam 54 may again be decelerated until the angular phase thereof with respect to the rotary drum 32 is retarded by 45° to resume the original angular relationship shown in FIG. 6A and the rotary cam 54 may then be rotated in synchronization with the rotary drum until the next shearing is effected. Alternatively, the rotary cam 54 may be accelerated after shearing to advance the angular phase thereof by 45° as shown in FIG. 6C, in order for the subsequent cutting to be effected by the leading side movable cutter blade 42E. Similarly, the phase of the rotary cam 54 may be further advanced or retarded to prepare for the next shearing which is to be performed by either of the movable cutter blades 42B, 42C, and 42D.

The length of each strip section 90 is determined by the number of corrugations which have been advanced past the nip during the interval between two consecutive shearing operations. In the illustrated embodiment, the movable and fixed cutter blades are provided each for every five teeth of the counterwheel so that it is possible to cut the continuous corrugated strip into sections having the number of corrugations equal to 5 multiplied by an integer. Generally, the number of corrugations of corrugated fins used in automobile radiators varies from 150 to 180. In the embodiment shown, the counterwheel 34 has 25 teeth in total so that in order to manufacture a series of corrugated fins each having 150 corrugations, the reciprocative cutter blade 42A must be activated one time for every six revolutions of the rotary drum 32. Similarly, where it is desired to produce a corrugated strip section having 160 corrugations, the movable cutter blade 42C may be activated after six revolutions counting from the preceding shearing by the movable cutter blade 42A. In this manner, the number of corrugations and hence, the length of strip sections may be varied by controlling the relative angular position of the rotary cam 54 with respect to the rotary drum 32.

Figure 8:
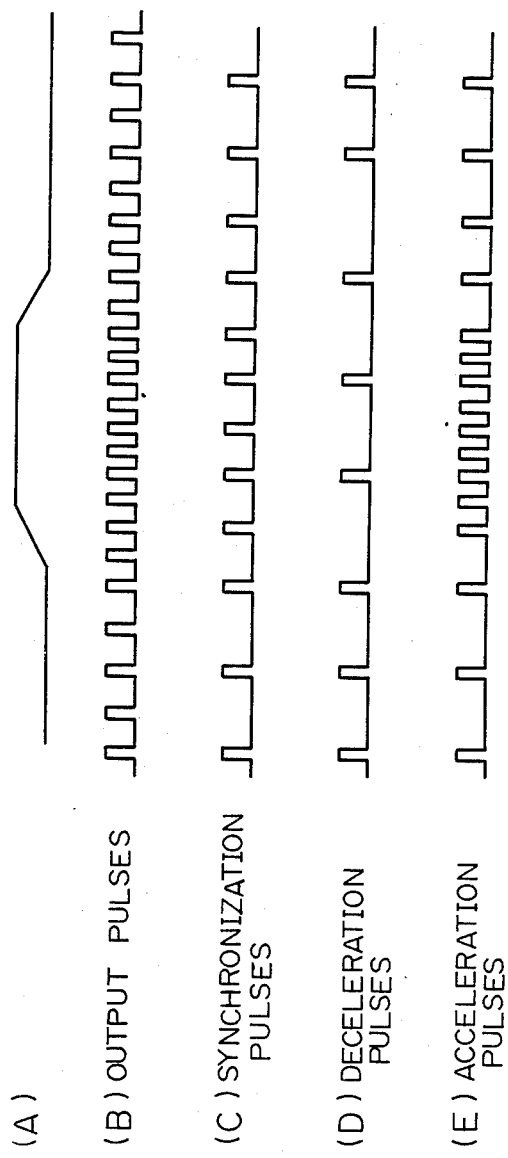
FIG. 8 is a time chart illustrating at (A) the variation in the speed of the counterwheel, at (B) the output pulse series, at (C) the synchronizing pulse series, at (D) the deceleration pulse series, and at (E) the acceleration pulse series.

The angular position of the rotary cam 54 may, in turn, be varied by controlling the rotational speed of the DC servomotor 58 by means of a control unit 200 shown in FIG. 7. The control unit 200 includes a wave shaping and frequency multiplier circuit 202, a first counter 204, an acceleration and deceleration data memory 206, AND gates 208 to 210, and OR gate 212, a digital switch 214, a pattern selection signal converter circuit 216, a cutter passage timing circuit 218, a second counter 220, and a cam motion switch-over data memory 222. The operation of the control unit 200 may be understood more clearly when considered in conjunction with the time chart shown in FIG. 8. The rotary encoder 74 is designed to deliver a predetermined number of pulses for each revolution of the counterwheel 34. Thus, the frequency of the output pulses from the rotary encoder 74 varies as shown at (B) in FIG. 8 in response to the variation in the rotational speed of the counterwheel 34 shown at (A) in FIG. 8. The output pulse series (FIG. 8 (B)) from the rotary encoder 74 is received by the wave shaping and frequency multiplier circuit 202 which shapes the waveform of the pulses and multiplies the frequency thereof in order to enhance the resolving power of the control unit. The output from the circuit 202 is received by the first counter 204. The first counter 204 is designed to be reset to zero and restart counting each time the rotary cutter is operated. The first counter 204 counts up the number of input pulses to detect the angular displacement of the counterwheel 34 and, hence, of the rotary drum 32 with respect to the reference angular position indicative of the position in which shearing is performed. The first counter 204 issues a digital signal corresponding to the angular position of the rotary drum toward the acceleration and deceleration data memory 206 and addresses the memory locations in response to the detected angular displacement from the reference position. The acceleration and deceleration data memory 206 stores information as to the angular position that must be assumed by the rotary cam 54 when the rotary drum 32 is in a given angular position. More particularly, the acceleration and deceleration data memory 206 comprises a first memory storing a synchronization pulse series (FIG. 8 (C)) by which the rotary cam 54 is rotated in synchronization with the rotary drum 32, a second memory storing a deceleration pulse series (FIG. 8 (D)) by which the rotary cam 54 is decelerated to retard the angular phase thereof with respect to the rotary drum 32, and a third memory storing an acceleration pulse series (FIG. 8 (E)) that is delivered when the rotary cam 54 is to be accelerated to advance the angular phase of the rotary cam 54. The synchronization, deceleration, and acceleration pulse data stored in the memory are retrieved therefrom in response to address signals from the first counter 204 and are delivered in a timed sequence to the AND gates 208, 209, and 210, respectively. As will be apparent from FIG. 8, the frequency of the synchronization pulse series (C) is proportional to the frequency of output pulses (B) of the rotary encoder 74, while the frequencies of the deceleration pulse series (D) and of the acceleration pulse series (E) are smaller and greater than the frequency of the synchronization pulse series (C), respectively. It will be understood, accordingly, that the rotary cam 54 is rotated in synchronization with the rotary drum 32 when the synchronization pulse series (C) is delivered to a positioning unit 224 of the DC servomotor 58, that the angular phase of the rotary cam 54 with respect to the rotary drum 32 is retarded when the deceleration pulse series (D) is delivered, and that the angular phase of the rotary cam 54 is advanced when the acceleration pulse series (E) is delivered. As is well known in the art, the positioning unit 224 of the DC servomotor 58 is designed to convert the input pulses into voltage variations and to feed-back control the servomotor to rotate through a predetermined angle each time one input pulse is received.

The output from the wave shaping and frequency multiplier circuit 202 is delivered to the cutter passage timing circuit 218 in order to control the timing and duration of delivery of the synchronization, deceleration, or acceleration pulse series. The timing circuit consists of a counter and is adapted to count up the pulse number of input pulses delivered after shearing and to issue one pulse to the second counter 220 each time any one of the reciprocative cutter blades is moved past the nip. The second counter 220 is constructed in such a manner as to count the number of reciprocative cutter blades that have passed the nip subsequent to the preceding shearing. The second counter 220 addresses the predetermined memory locations of the cam motion switch-over data memory 222 in response to the number of cutter passage causing it to deliver the switch-over data previously stored therein toward the AND gates 208, 209, and 210.

The desired length of the sheared strip sections is selected by the digital switch 214. The digital switch 214 is intended to give instructions as to the number of corrugations for which each shearing must be made. The digital switch 214 delivers to the pattern selection signal converter circuit 216 a digital signal indicative of the selected number of corrugations. The pattern selection signal converter circuit 216 converts the digital signal from the switch 214 into a pattern selection signal indicative of one of a plurality of deceleration and acceleration sequence patterns stored in the cam motion switch-over memory 222 and delivers the pattern selection signal to the memory 222.

The cam motion switch-over memory 222 stores therein a data base consisting of a plurality of sequence patterns, each of which is indicative of the timing and sequence of the combination of the deceleration, acceleration, and synchronization pulse series to be delivered to the positioning unit 224 for each desired strip length selected by the digital switch 214. For example, for a mode of operation wherein shearing is to be effected for every 150 corrugations of the continuous corrugated strip, the sequence pattern for this mode may be stored in the memory locations 0 through 9 of the memory 222, with the memory locations 0 and 1 including data indicating that a high level signal is delivered to the AND gate 208 which is receiving the synchronization pulse series (C) from the acceleration and deceleration data memory 206, the memory location 2 including data indicating that a high level signal is delivered to the AND gate 209 which is receiving the deceleration pulse series (D), the memory locations 3 through 7 including data indicating that a high level signal is delivered to the AND gate 208, the memory location 8 including data indicating that a high level signal is delivered to the AND gate 210 receiving the acceleration pulse series (E), and the memory location 9 including data indicative of the high level signal to be delivered to the AND gate 208. It will be understood that, when the above-mentioned sequence pattern is followed, the AND gate 208 is turned on during the data output from the memory locations 3 through 7 causing the OR gate 212 to deliver the synchronization pulse series (C) to the positioning unit 224, whereby the rotary cam is rotated in synchronization with the rotary drum without cutting the continuous corrugated strip (FIG. 6A). As the value of the second counter 220 is incremented by one to address the memory location 8, the cam motion switch-over memory 222 delivers a signal to the AND gate 210 to turn on the latter so that the acceleration pulse series (E) is sent to the positioning unit 224, thereby advancing the phase of the rotary cam to project the movable cutter blade 42 out of the rotary drum 32. As the second counter 220 counts up further to address the memory locations 9, 0, and 1 in sequence, the rotary cam is rotated in synchronization with the rotary drum with the cutting edge of the movable cutter blade in its projected position, so that the movable cutter blade is brought into engagement with the associated fixed cutter blade as it passes the nip, thereby shearing the continuous strip (FIG. 6B). When the second counter is incremented further to address the memory location 2, the cam motion switch-over memory 222 delivers a signal to the AND gate 209 to turn it on, so that the acceleration data memory 206 issues the deceleration pulse series (D) to the positioning unit 224, whereby the angular phase of the rotary cam is retarded, thereby causing the movable cutter blade to retract within the rotary drum.

The data for other sequence patterns required for other modes of operation to cut the strip into various other lengths may be stored in a similar manner in the other memory locations of the cam motion switch-over memory 22.

It should be noted that the corrugated strip cutter according to the present invention is of the rotary type, which is particularly suitable for high speed operations. It has been proven that the rotary cutter according to the invention is capable of processing a continuous corrugated strip at a speed from 8 to 10 times higher than that of conventional flying shears.

As is well known in the art, during the manufacture of corrugated fins, the feed speed of the flat strip 20 being advanced to a cutting machine varies considerably depending on various manufacturing conditions. The feed speed must also be changed quickly when the operation of the cutting machine is switched over from a mode of operation in which a series of strip sections having a predetermined length are to be manufactured to another operational mode for producing strip sections having a different length. All movable parts of the rotary cutter according to the invention are able to quickly respond to any such rapid change in the feed speed with a response sufficient to perform cutting exactly at the apex of a desired corrugation even immediately after a rapid change in the feed speed.

It will be noted that the rotation of the rotary cam is controlled by the control unit, which controls the servomotor in response to the rotational angle of the rotary drum detected through the counterwheel by the rotary encoder. Thus, it is possible to alter the length of the strip sections by a single maneuver without stopping the entire manufacturing apparatus.

It should also be appreciated that the structure of the rotary cutter according to the invention is much simpler as compared with the conventional flying shears. The use of rotary cutter further ensures an extremely high speed operation without the problem of vibration. Therefore, the possibility of malfunctions is considerably reduced. The fixed cutter blades may be readily dismounted from the counterwheel for repair and replacement. Spring-back of the material at the shear line may be prevented by the movable and fixed cutter blades cooperating to permanently deform the ends of the sheared sections.

While the present invention has been described with reference to a specific embodiment thereof, it should be understood that the invention is not limited thereto and various changes and modifications may be made therein within the scope of the present invention. For example, the rotary drum has been described and illustrated herein as having five movable cutter blades for the purposes of varying the length of the strip sections per an increment corresponding to five corrugations. However, the number of movable cutter blades and the angular distances between consecutive cutter blades may be varied where desired.

We claim:

1. A rotary cutter for cutting a continuous corrugated strip into strip sections having various lengths, which comprises:
   a frame;
   a rotary drum mounted for rotation on said frame and having at least one radial slot therethrough extending in the axial direction;
   means for rotating said rotary drum;
   at least one reciprocative cutter blade having a cutting edge at its outer end, said reciprocative cutter blade being slidably received in said radial slot for movement between a retracted position in which said cutting edge is retracted substantially within the confinement of the outer circumference of said drum and a projected position in which said cutting edge is protracted radially outward beyond the outer circumference of the rotary drum;

means for biasing said reciprocative cutter blade toward said retracted position;

a rotary cam mounted on said frame for rotation inside of said drum coaxially therewith, said rotary cam having a cam nose engageable with an inner end of said reciprocative cutter blade to urge said cutter blade radially outward into said projected position;

a toothed counterwheel mounted on said frame adjacent to said rotary drum for rotation in synchronization with said rotary drum, said counterwheel having teeth positively engageable with the continuous corrugated strip;

at least one fixed cutter blade secured to the outer periphery of the counterwheel at an angular position to cooperate with said reciprocative cutter blade;

drive means for rotating said rotary cam; and control means for controlling said drive means in such a manner that, during the non-cutting mode of operation of the rotary cutter, the rotary cam is rotated in synchronization with the rotary drum, with the cam nose being angularly offset from the inner end of said reciprocative cutter blade, thereby allowing the rotary drum and the counterwheel to rotate without cutting the corrugated strip, and that, during the cutting mode of operation, the rotary cam is rotated in synchronization with said rotary drum, with the cam nose engaging the inner end of the reciprocative cutter blade for at least a rotational angle of said rotary drum and said counterwheel, wherein said reciprocative cutter blade is facing said fixed cutter blade, thereby projecting said reciprocative cutter blade radially outward into engagement with the associated fixed cutter blade to cut the corrugated strip.

2. A rotary cutter according to claim 1, wherein said rotary drum and said counterwheel, respectively, have a plurality of angularly equally spaced reciprocative cutter blades and a plurality of angularly equally spaced fixed cutter blades cooperating with each other.

3. A rotary cutter according to claim 1, wherein said fixed cutter blade is detachably mounted to said counterwheel.

4. A rotary cutter according to claim 1, wherein said reciprocative cutter blade has at said inner end a roller rolling on the cam profile of said rotary cam.

5. A rotary cutter according to claim 1, wherein said cutting edge of said reciprocative cutter blade and an associated end of said fixed cutter blade are so shaped as to permanently deform the strip sections enough to preclude spring-back at a shear point.

6. A rotary cutter, comprising:

a rotary drum slidably receiving at least one radially removable cutter blade;

a fixed cutter blade provided on the outer periphery of a counterwheel;

a rotary cam having a cam nose disposed for engagement with a radially inner end of said movable cutter blade for sliding said movable cutter blade radially outwardly into cooperation with said fixed cutter blade to effect shearing;

a servomotor controlled by a control unit;

said rotary cam being operatively associated with said servomotor for rotation thereby in synchronization with said rotary drum;

said control unit being so associated with said servomotor as to cause said servomotor to offset said cam nose from said movable cutter blade when said rotary cutter is in a non-cutting mode, and so as to cause said servomotor to rotate said rotary cam with said cam nose engaging said movable cutter blade when said rotary cutter is in a cutting mode; and said control unit being so associated with said rotary cam as to accelerate and decelerate said rotary cam during rotation thereof, for bringing said cam nose into registration with any selected one of said at least one movable cutter blade as such movable cutter blade passes said fixed cutter blade on said counterwheel, whereby any selected one of said at least one movable cutter blade may be slid radially outward for shearing a strip being conveyed between said rotary drum and said counterwheel into successive sections, each having a length equal to the distance circumferentially of said rotary drum between adjacent ones of said at least one movable cutter blade, multiplied by an integer.

7. The rotary cutter of claim 6, wherein:

said at least one radially movable cutter is constituted by a plurality of movable cutters.

* * * * *